May 19, 1959 J. R. A. BEALE 2,887,423
SEMI-CONDUCTOR DEVICE
Filed June 10, 1957
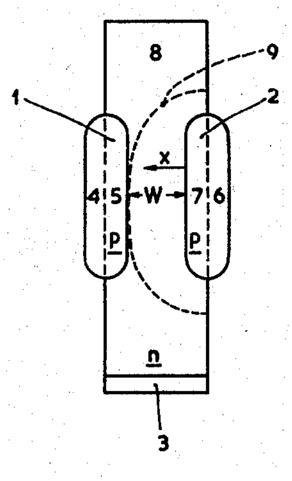
INVENTOR
J. R. A. BEALE
BY Frank R. Trifari
AGENT

United States Patent Office 2,887,423

Patented May 19, 1959

2,887,423

SEMI-CONDUCTOR DEVICE

Julian Robert Anthony Beale, Wraysbury, near Staines, England

Application June 10, 1957, Serial No. 664,752

Claims priority, application Great Britain June 18, 1956

4 Claims. (Cl. 148—33)

The present invention relates to semi-conductor devices suitable for use in the circuits claimed and described in a co-pending application Serial No. 593,704, filed June 25, 1956.

In a junction transistor, there may exist four turn-over voltages at which collector current increases rapidly with collector voltage.

These four voltages are referred to in this specification as $V_Z$, $V_B$, $V_X$ and $V_P$ and are defined as follows:

$V_Z$ is the collector-base voltage, the Zener voltage, at which diode breakdown occurs while M does not tend to infinity, $V_B$ is the collector-base breakdown voltage at which M tends to infinity, $V_X$ is the collector-base voltage at which $\alpha M=1$, and $V_P$ is the collector-emitter voltage at which the collector depletion layer extends to the emitter junction giving a substantially unidirectional field right across the base (punch-through effect), where:

M is the multiplication factor of the current ($i_r$) reaching the collector depletion layer from the base with respect to the current ($i_1$) passing from the depletion layer into the collector ($=i_r/i_1$), and $\alpha$ is the fraction of the emitter current which reaches the collector depletion layer (and includes a factor dependent upon emitter efficiency), the term $\alpha$M may be regarded as the ratio of the collector current divided by the emitter current. All currents mentioned in the above definitions are incremental currents.

Of the voltages $V_Z$ and $V_B$, only that voltage having the lower value is of importance in normal transistor use since the higher voltage will not be attainable.

This specification is, however, directed to transistors for which the voltage $V_P$ is important, that is transistors with which a punch-through effect is possible. Such transistors have existed before, selected, for example, by testing experimental high-frequency transistors to determine which are suitable, usually about 10% of these tested, and it has now been found that for such transistors $V_X<V_P<V_B$ or $V_Z$ whichever is lower, that is that the punch-through effect occurs before either $V_B$ or $V_Z$ is reached.

The object of the present invention is to provide a definite method of manufacturing transistors for use in said circuits which it is estimated is capable of producing at least a 50% useful yield.

According to the present invention, a method of manufacturing a transistor comprises the steps of selecting a base crystal having a resistivity of between 0.5 ohm-cm. and 1 ohm-cm., providing alloy electrodes on the crystal, selecting the size of the pellets to be alloyed to provide the alloy electrodes so that the internal collector capacitance is less than 15 pf. with a voltage difference of 3 volts between the base and the collector, and selecting the thickness of the crystal in accordance with the pellet size and the depth of alloying so that the minimum base width is such that the collector-emitter voltage $V_P$ at which the collector depletion layer extends to the emitter junction giving a substantially unidirectional field right across the base, lies between the voltage $V_X$ and the voltage $V_B$ or $V_Z$ whichever is lower.

The present invention also relates to transistors when manufactured by the method according to the present invention.

A theory on which the present invention is based, but by which the present invention is not limited, will now be described with reference to one embodiment of a transistor according to the present invention shown in the diagrammatic drawing and for which $V_B$ is lower than $V_Z$.

Referring now to the figure, a transistor comprises an emitter 1, a collector 2 and an ohmic base electrode 3. The emitter 1 comprises a part 4 of indium and a part 5 of indium-saturated recrystallized germanium. The collector 2 comprises a part 6 of indium and a part 7 of indium-saturated recrystallized germanium. The rest 8 of the germanium single crystal is of n-type germanium and has a resistivity $\rho$ of between 0.5 ohm-cm. and 10 ohm-cm.

The minimum distance (minimum base width) W between the two p-type regions is such that "punch-through" occurs, that is that the collector depletion layer extends, as is indicated by the broken line 9, right across the base width W as far as the emitter p-region (part 5) at a collector-emitter voltage $V_P$ lying between the voltages $V_B$, and $V_X$.

For this germanium transistor having an n-type base region, the thickness $x$ of the depletion layer, measured in the direction of the arrow $x$, is given by $$x \cong \sqrt{V.\rho}$$

where $x$ is in microns, V is the voltage applied between the collector and base in volts and $\rho$ is the resistivity of the base in ohm-cm.

In any practical transistor suitable for use in said circuits, the separation between the emitter and collector must be small, about a few microns, and in order to manufacture successfully, that is to produce a relatively high percentage of transistors suitable for use in said circuits, it is necessary to choose materials, dimensions and manufacturing conditions within limited ranges. Since a spread in base thickness W over a batch of transistors is unavoidable and is substantially independent of the resistivity of the base material, in order to manufacture successfully the admissible spread should be wide, that is the difference between $V_B$ and $V_X$ should be large.

Another consideration which appears to apply since $$\frac{dx}{dV} \cong \frac{1}{2}\sqrt{\frac{\rho}{V}}$$

and hence $$\frac{dx}{dV} \propto \sqrt{\rho}$$

is that $\rho$ should be as large as possible. However, there are disadvantages particularly that M decreases with increasing $\rho$ so that $V_X$ increases with increase in $\rho$, which increase would necessitate a larger collector voltage and would therefore limit the size of the current pulse owing to the limiting heat dissipation from the transistor. With a base resistivity below 0.5 ohm-cm., high values of M are not possible since Zener breakdown occurs before the voltage $V_B$ is reached.

The range of resistivity values selected in the method and transistor according to the present invention is between .5 ohm-cm. and 10 ohm-cm. and the preferred range is between 0.6 ohm-cm. and 1 ohm-cm.

A further consideration which is of practical importance is that the maximum frequency of variation of collector voltage should be sufficiently high so that the punch-through circuit cycle, for example, under the control of a charging and discharging capacitor, may be sufficiently rapid. The major factors in operation are the capacitance of the external collector circuit and the internal collector capacitance *Cci*. With a circuit in which the charge and discharge of a capacitor is involved, the time constant of the collector circuit should not be too great, and hence *Cci* must be low. The limiting consideration chosen is that the *Cci* is less than 15 pf. with a voltage difference of 3 volts between the base and the collector.

It is preferred to make the emitter and collector substantially the same size in order to increase the percentage yield, since some junctions are leaky and if one only of the two junctions is leaky the transistor will then operate successfully, if it is otherwise suitable, if the leaky junction is connected to the emitter circuit.

One example of a transistor according to the invention calculated theoretically will now be described.

Assume that the resistivity $\rho$ of n-type germanium transistor base is .81 ohm-cm.; in such a transistor $V_B$ is lower than $V_Z$.

Since $$x \cong \sqrt{V.\rho}$$

$$x \cong .9\sqrt{V}$$

Now the minimum base width X must be chosen so that punch-through is obtained at a voltage $V_P$ between $V_B$ and $V_X$ and is determined by the initial thickness of the crystal, alloy-contact pellet sizes and alloying temperature.

Consider now the minimum base width W at $V_B$, $V_B$ being substantially solely dependent on the base resistivity and in the present case about 64 volts.

$$x_{max} \cong .9 \times \sqrt{64} \text{ microns}$$
$$\cong 7.2 \text{ microns}$$

Also assume that $$\alpha' \text{ (which equals } \frac{\alpha}{1-\alpha}\text{)} = 16$$

Then $\alpha \cong 16/17$

And if $\alpha M = 1$, then $M \cong 17/16$.

Now $$M \cong \frac{1}{1-\left(\frac{V}{V_B}\right)^3}$$

$$\frac{17}{16} \cong \frac{1}{1-\left(\frac{V}{64}\right)^3}$$

and $$V \cong 25 \text{ volts}$$

Thus $$x_{min} \cong .9\sqrt{25}$$
$$\cong 4.5 \text{ microns}$$

Thus in order to operate satisfactorily in said circuits with a crystal having a base resistivity of .81 ohm-cm., the minimum base width W must be between $x_{max}$ and $x_{min}$, since the depletion layer has to extend across the base, and hence between about 4.5 microns and about 7.2 microns.

The internal collector capacitance, for a given base resistivity, is determined by the area of the collector electrode, since for each voltage between the base and the collector $$CciA/\sqrt{\rho}$$

so that if the resistivity is small the collector area must also be small and is selected so that *Cci* is less than 15 pf. with a voltage difference of 3 volts between the base and the collector.

A practical embodiment of a method of manufacturing a transistor according to the present invention from an n-type germanium base crystal of germanium of resistivity of .81 ohm-cm. will now be described.

The base crystal is 90 microns thick. Two equal spheres of indium of about 425 microns diameter are secured opposite to one another on opposite faces of the base crystal and alloy electrodes provided by heating at a temperature of about 540° C. for about 20 minutes.

The resulting minimum base width W was between 4.5 microns and 7.2 microns and the internal collector capacitance below 15 pf. with a voltage difference of 3 volts between the base and the collector.

It will be obvious that the transistor will also be provided with conductive connections to the emitter 1, the collector 2 and the base electrode 3 and may be encapsulated since such operations are well known they will not be described further herein.

A simple practical test to determine whether it is possible to use a p-n-p transistor so manufactured in said circuits is as follows:

(i) Connect the transistor as a diode with the emitter open-circuit and determine the voltage difference between the base and collector at which the current increases steeply.

(ii) Connect the emitter and base directly together with a base bias voltage of two volts positive with respect to the emitter and determine the voltage difference between the collector and the base at which current starts to increase steeply, the start of the steep current rise, in general, is followed by oscillation of the transistor circuit.

If the voltage difference (ii) is less than the voltage difference (i) then punch-through occurs before breakdown ($V_B$) occurs and the desired use is possible. The question of internal collector capacitance, which affects the repetition speed, has of course to be determined separately.

Although the mathematical example and practical embodiment discussed above are in relation to germanium p-n-p transistors, similar considerations apply to germanium n-p-n transistors in which case $$M = \frac{1}{1-\left(\frac{V}{V_B}\right)^v}$$

and $$X \cong \frac{V\rho}{2}$$

where $y \cong 5$, $x$ is in microns, $\rho$ is in ohm-cm. and V is in volts.

Similar considerations also apply, for example, in relation to silicon-base transistors within the scope of the statement of method according to the present invention given above. Further, where $V_Z$ is lower than $V_B$, similar considerations apply and $V_B$ or $V_Z$ may be found experimentally in any case.

What is claimed is:

1. A transistor comprising a semi-conductive body containing opposed emitter and collector regions of given size defining therebetween a base region of given width and possessing a resistivity in the range between 0.5 and 10 ohm-cm., and emitter, collector and base contacts to their respective regions, said transistor possessing an internal collector capacitance of less than 15 piccofarads at an applied voltage between the collector and base of 3 volts, the size of the emitter and collector regions and the base width having values at which the value of the applied voltage between collector and emitter at which punch-through occurs lies between the collector-base voltage value at which $\alpha$M equals 1 and the collector-base breakdown voltage, where $\alpha$M is the ratio of the collector current and the emitter current.

2. A transistor as set forth in claim 2 wherein the transistor is a p-n-p transistor.

3. A transistor comprising a semi-conductive body containing opposed recrystallized emitter and collector regions of the same given size defining therebetween a base region of given width and possessing a resistivity in the range between 0.6 and 1 ohm-cm., and emitter, collector and base contacts to their respective regions, said transistor possessing an internal collector capacitance of less than 15 piccofarads at an applied voltage between the collector and base of 3 volts, the size of the emitter and collector regions and the base width having values at which the value of the applied voltage between collector and emitter at which punch-through occurs lies between the collector-base voltage value at which $\alpha M$ equals 1 and the collector-base breakdown voltage, where $\alpha M$ is the ratio of the collector current and the emitter current.

4. A transistor as set forth in claim 3 wherein the base width is in the range of about 4 to 8 microns, and the semi-conductive body is germanium.

References Cited in the file of this patent

RCA Review, December 1953, vol. XIV, No. 4, pages 586–598.

UNITED STATES PATENT OFFICE

CERTIFICATE OF CORRECTION

May 19, 1959

Patent No. 2,887,423

Julian Robert Anthony Beale

It is hereby certified that error appears in the printed specification of the above numbered patent requiring correction and that the said Letters Patent should read as corrected below.

Column 1, line 24, for "Zener voltage" read -- Zener breakdown voltage --; same column 1, line 67, column 3, lines 9 and 71 and 72, and column 4, line 11, for "15 pf." read -- 15 pFs --; column 4, line 74, for the claim reference numeral "2" read -- 1 --.

Signed and sealed this 1st day of March 1960.

(SEAL)

Attest:

KARL H. AXLINE

Attesting Officer

ROBERT C. WATSON

Commissioner of Patents